US011354387B1

(12) United States Patent
Pereira et al.

(10) Patent No.: US 11,354,387 B1
(45) Date of Patent: Jun. 7, 2022

(54) MANAGING SYSTEM RUN-LEVELS

(71) Applicant: SAP SE, Walldorf (DE)

(72) Inventors: Bolivar Santos Perez Pereira, Porto Alegre (BR); Martin Hartig, Speyer (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/201,730

(22) Filed: Mar. 15, 2021

(51) Int. Cl.
G06F 11/07 (2006.01)
G06F 21/31 (2013.01)
G06F 11/14 (2006.01)

(52) U.S. Cl.
CPC ............ *G06F 21/31* (2013.01); *G06F 11/142* (2013.01)

(58) Field of Classification Search
CPC ............... G06F 11/142; G06F 11/1415; G06F 11/1402; G06F 11/1407; G06F 11/1446; G06F 11/1469; G06F 11/1471; G06F 21/31
See application file for complete search history.

(56) References Cited

U.S. PATENT DOCUMENTS

| 7,823,153 | B1* | 10/2010 | Pashenkov | G06F 11/1407 |
| | | | | 718/100 |
| 9,749,441 | B2 | 8/2017 | Friedmann et al. | |
| 2009/0217255 | A1* | 8/2009 | Troan | G06F 11/1433 |
| | | | | 717/168 |
| 2011/0138027 | A1* | 6/2011 | Friedmann | G06F 16/284 |
| | | | | 709/223 |
| 2013/0325967 | A1 | 12/2013 | Parks et al. | |
| 2016/0048408 | A1 | 2/2016 | Madhu et al. | |
| 2018/0004503 | A1* | 1/2018 | OlmstedThompson | G06F 9/45533 |
| 2020/0193034 | A1* | 6/2020 | Rodriguez Bravo | G06F 21/6254 |

OTHER PUBLICATIONS

"Administration Guide for SAP Data Hub," Doc. Ver. 2.75, 222 pages, Jul. 15, 2020.
Khan, A., "Key Characteristics of a Container Orchestration Platform to Enable a Modem Application," IEEE Cloud Computing, 10 pages, Sep. 2017.

(Continued)

*Primary Examiner* — Matthew M Kim
*Assistant Examiner* — Kyle Emanuele
(74) *Attorney, Agent, or Firm* — Sterne, Kessler, Goldstein & Fox P.L.L.C.

(57) ABSTRACT

Disclosed herein are system, method, and computer program product embodiments for transitioning virtual systems from one run-level to a next run-level. In an embodiment, a controller may receive a run-level request to transition a computing cluster (e.g., vSystem) from a first run-level to a second run-level. The controller persists a current run-level of the computing cluster as the second run-level in a configuration file. The controller executes a set of actions corresponding to the second run-level to transition the computing cluster from the first run-level to the second-level. A gateway of the computing cluster receives a request to access the computing cluster. The request includes a user's authentication details. The gateway grants or restricts access to the computing cluster based on the type of user attempting to access the computing cluster and the current run-level of the computing cluster as indicated in the configuration file.

17 Claims, 6 Drawing Sheets

(56) References Cited

OTHER PUBLICATIONS

"Running Containerized Microservices on AWS," Amazon Web Services, Inc., 25 pages, Nov. 2017.
"Start-up and Shutdown," Hewlett-Packard Development Company, L.P., https://docstore.mik.ua/manuals/hp-ux/en/5992-4580/ch03s07.html, 10 pages, printed Oct. 1, 2020.
"State Management," Cloudera, Inc., https://docs.cloudera.com/cloudera-manager/7.1.0/concepts/topics/cm-state-managerent.html, 2 pages, printed Oct. 1, 2020.

* cited by examiner

MANAGING SYSTEM RUN-LEVELS

BACKGROUND

A virtual system (vSystem) can be a computing cluster that includes one or more servers and hosts multiple applications or workloads. Over time, the vSystem may need to be backed up, or maintenance may be needed to be provided to the vSystem. The maintenance may include upgrades, recoveries, or other types of maintenance. In this regard, active user sessions and applications (or workloads) being executed during the maintenance of the vSystem may disrupt the maintenance. As a result, this may cause operational errors, failure to complete the upgrades, incompatible versions of applications (or workloads), etc. Such issues may cause loss of data and system failures.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
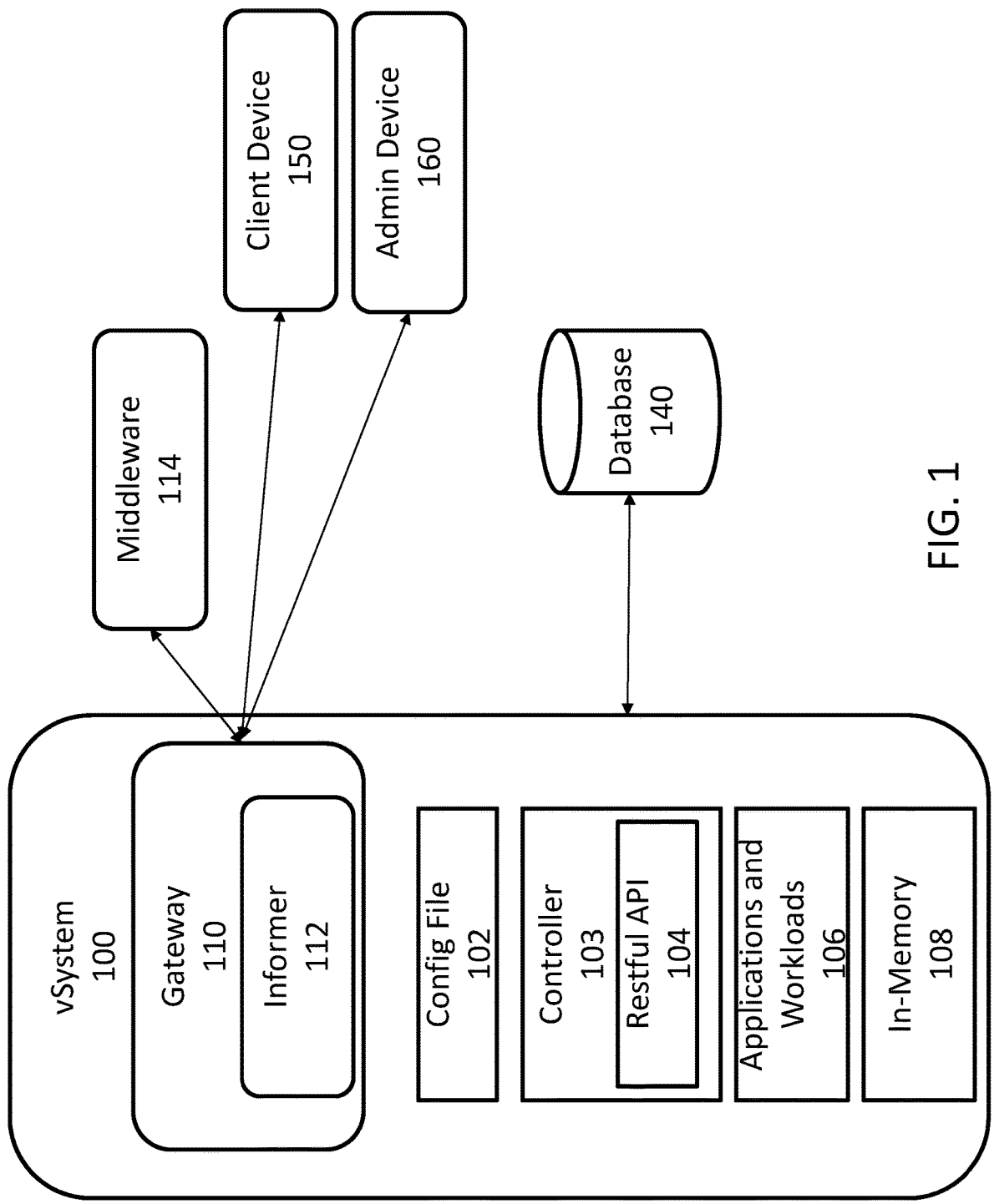
FIG. 1 is a block diagram of an architecture for managing run-levels, according to some embodiments.

Provided herein are system, apparatus, device, method and/or computer program product embodiments, and/or combinations and sub-combinations thereof, for identifying and loading a relevant page of a dictionary into temporary memory.

As described above, a virtual system (i.e., vSystem) may be a computing cluster including multiple computing resources. For example, a vSystem may include one or more servers, data storages devices, computing devices, etc. Furthermore, the vSystem may host one or more applications or workloads that are executed using the computing resources of the vSystem. The computing resources, applications, and workloads may need to be upgraded, recovered, backed up, etc. As such, maintenance may need to be performed on the vSystem.

When performing maintenance on the vSystem, the vSystem may transition from a running (or execution) run-level to a maintenance run-level. Furthermore, the vSystem may also transition from a maintenance run-level to a stopped run-level. While in the maintenance run-level or stopped run-level, any active user sessions or applications, or workloads being executed on the vSystem may disrupt the maintenance of the vSystem. This may cause operational errors, failure of completing the upgrades, system crashes, incompatible versions of applications (or workloads), etc. Such issues may cause loss of data and system failures.

The present disclosure solves these issues by terminating the appropriate applications, workloads, and user sessions when transitioning to maintenance and stopped run-levels and restricting certain users' access to the vSystem during maintenance and stopped run-levels. In an embodiment, a controller may receive a run-level request to transition a computing cluster (e.g., vSystem) from a first run-level to a second run-level. The computing cluster includes one or more servers, and the computing cluster may reside on at least one server of the computing cluster. The controller may be responsible for managing the state of the vSystem.

The controller persists a current run-level of the computing cluster as the second run-level in a configuration file. The controller executes a set of actions corresponding to the second run-level to transition the computing cluster from the first run-level to the second-level. A gateway of the computing cluster receives a request to access the computing cluster. The request includes a user's authentication details. The gateway determines a type of user attempting to access the computing cluster based on the user's authentication details. The gateway retrieves a set of restrictions for accessing the computing cluster corresponding to the current run-level of the computing cluster as indicated in the configuration file and the type of user attempting to access the computing cluster. The gateway grants or restricts access to the computing cluster based on the set of restrictions.

This configuration ensures that only administrators may access the vSystem while maintenance is being performed on the vSystem. A non-administrator user may not access the vSystem during maintenance to execute or interface with applications. As a result, the maintenance of the vSystem remains undisrupted and is allowed to be completed gracefully. By doing so, this configuration prevents potential system failures, operational errors, failed backups, loss of data, and failed recoveries.

FIG. 1 is a block diagram of an architecture for managing run-levels, according to some embodiments. In an embodiment, the architecture may include a vSystem 100, middleware 114, database 140, client device 150, and admin device 160. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

vSystem 100 may be a virtual system. The virtual system may be a computing cluster that includes a collection of computing resources such as servers, routers, workstations, etc. vSystem 100 may also host applications and workloads 106. As an example, vSystem 100 may be implemented using Kubernetes. Kubernetes is a portable and extensible platform for managing containerized workloads and applications (e.g., applications and workloads 106). As a non-limiting example, vSystem 100 may be implemented using Kubernetes, and as a result, vSystem 100 may be a Kubernetes (K8s) cluster. Applications and workloads 106 execute one or more microservices. The microservices may reside in Kubernetes pods. A Kubernetes pod is a group of one or more containers. The containers share storage and network resources and a specification for how to run the containers.

vSystem 100 may reside in a cloud computing environment. Applications and workloads 106 may be cloud-native applications and workloads. In some embodiments, vSystem 100 may be a collection of computing clusters. Different microservices corresponding to a single application may be distributed throughout the collection of computing clusters. Furthermore, each computing cluster may execute one or more applications and workloads.

Users may access vSystem 100 to execute or halt one or more applications and workloads. For example, vSystem 100 may allow access to member users and administrator users. Member users may use vSystem 100 to host their applications and workloads. These applications may be non-administrative applications. Therefore, vSystem 100 may host one or more non-administrative applications of applications and workloads 106. Moreover, member users may use vSystem 100 to execute and halt the non-administrative applications and workloads hosted by vSystem 100.

Administrator users may use vSystem 100 to maintain vSystem 100. Maintaining vSystem 100 may involve upgrades, recoveries, backups, etc. Administrator users may use one or more administrative applications of applications and workloads 106 to maintain vSystem 100. For example, the one or more administrative applications may facilitate upgrading one or more components of vSystem 100, recovering one or more components of vSystem 100, and backing up one or more components of vSystem 100.

vSystem 100 may operate in multiple different run-levels. For example, vSystem 100 may operate in an execution (e.g., running) run-level, maintenance run-level, or stopped run-level. During the execution run-level, vSystem 100 may execute all the necessary applications and workloads 106 and allow access to all the administrative users and member users. During the maintenance run-level, vSystem 100 may perform back-ups, recoveries, updates, or general maintenance on the components of vSystem 100. During the stopped run-level, vSystem 100 may not operate. As a result, the applications and workloads 106 may be terminated, and all active user sessions may be terminated. vSystem 100 may operate on additional or fewer run-levels.

vSystem 100 may include a config file 102 (e.g., configuration file), controller 103, and in-memory 108. The config file 102 may be a text file that stores a current run-level of vSystem 100. For example, config file 102 may be a Kubernetes ConfigMap. The Kubernetes ConfigMap may be an Application Protocol Interface (API) used to store non-confidential data in key-value pairs. As a result, vSystem 100's current run-level may be persisted in config file 102. In this regard, config file 102 may indicate whether vSystem 100 is in execution (e.g., running) run-level, maintenance run-level, or stopped run-level.

Controller 103 may regulate the state of vSystem 100. For example, controller 103 may transition vSystem 100 from one run-level to the next. Before transitioning from one run-level to the next, controller 103 may persist the next run-level in config file 102. Moreover, controller 103 may start or terminate applications and workloads 106 executing on vSystem 100. Controller 103 may also terminate active user sessions on vSystem 100. Additionally, controller 103 may be configured to capture a state of vSystem 100.

Representational state transfer (RESTful) API 104 may be used to interface with controller 103. RESTful API 104 may be an API that uses HTTP requests to communicate (e.g., GET, PUT, POST, and DELETE). More specifically, administrators may communicate with controller 103 through the RESTful API 104 to transmit a run-level request to change the run-level of vSystem 100. RESTful API 104 may receive and forward the run-level request to controller 103.

In-memory 108 may be a local storage device within vSystem 100 configured to store a captured state of vSystem 100. The state may include the current applications or workloads 106 being executed and the values of other variables when the state was captured. In-memory 108 may be a short-term or long-term data storage device.

Gateway 110 may be an API that manages access to vSystem 100. More specifically, gateway 110 may grant or restrict user access to vSystem 100. For example, gateway 110 may implement informer 112. Informer 112 may be an API that may be configured to access config file 102 to determine a current run-level of vSystem 100.

Furthermore, gateway 110 may be in communication with middleware 114. Middleware 114 may be a middleware software configured to store the set of restrictions for each run-level and users' permissions corresponding to each run-level. For example, middleware 114 may store restrictions indicating that an administrator user may access vSystem 100 during the execution run-level and the maintenance run level. Moreover, middleware 114 may store restrictions indicating that a member user may access vSystem 100 during the execution run-level. Neither the administrator user nor the member user may access vSystem 100 during the stopped run-level. The member user may not access vSystem 100 during the maintenance run-level. Middleware 114 may also indicate which applications and workloads of applications and workloads 106 a member user or an administrator user can access during a current run-level of vSystem 100.

Informer 112 may interface with config file 102 to determine the run-level of vSystem 100, and gateway 110 may interface with middleware 114 to determine the permission settings for each user. As a result, gateway 110 may grant or restrict user access to vSystem 100 based on the user's permissions settings and the run-level of vSystem 100.

Database 140 may include one or more data storage devices configured to store various types of data. Database 140 may store user information, including each user's type (e.g., member or administrator). Database 140 may also store user sessions.

Client device 150 may be operated by a member user to access vSystem 100. For example, the member user may use an internet browser or a web-based application to access vSystem 100. A request may be transmitted to gateway 110, and gateway 110 may grant or restrict access to the member user based on the user's permission settings and the run-level of vSystem 100. As stated above, the member user may access vSystem during the execution run-level.

In the event gateway 110 grants a member user access to vSystem 100, gateway 110 may store an active member user session in database 140. A member user may access vSystem to interface with one or more applications or workloads. For example, the user's permission settings may also indicate that the member user is only able to access the one or more applications or workloads of applications and workloads 106.

Administrator device 160 may be operated by an administrator user to access vSystem 100. The administrator user may be responsible for maintaining vSystem 100. For example, the administrator user may be use admin device 160 to access vSystem 100. The administrator user may initiate updates, recoveries, backups, etc., for vSystem 100. In this regard, the administrator user may initiate a change in a run-level of vSystem 100. Furthermore, the administrator user may start or terminate applications and workloads 106 and terminate active user sessions. The administrator user may access the vSystem 100 during the execution run-level and the maintenance run-level.

Figure 2:
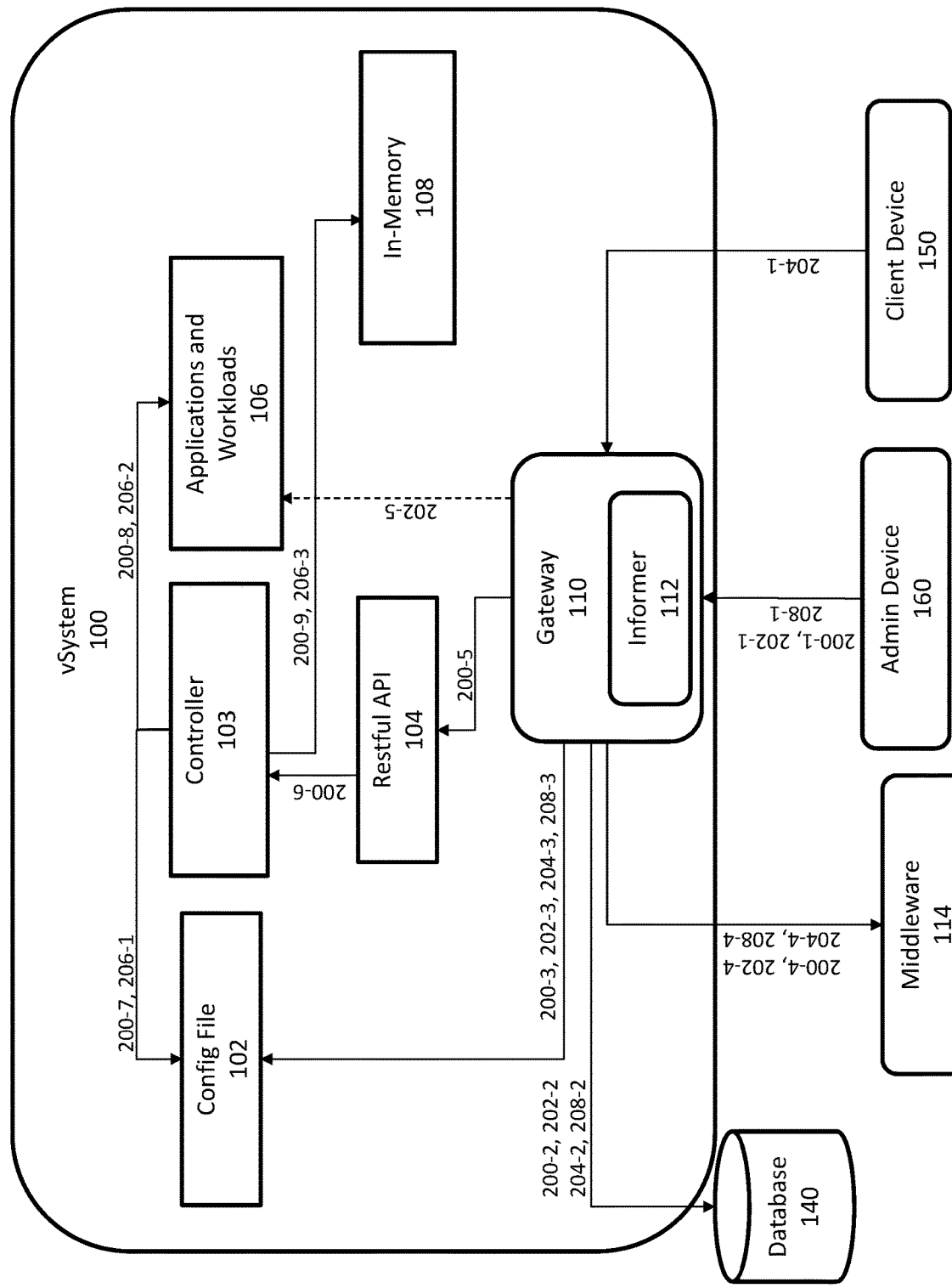
FIG. 2 is a block diagram illustrating the data flow in the system for managing run-levels, according to some embodiments.

FIG. 2 is a block diagram illustrating the data flow in the system for managing run-levels. In a given embodiment, admin device 160 may transmit run-level request 200-1 to vSystem 100. vSystem 200-1 may be operating in a running run-level, and the run-level request 200-1 may be a request to execute maintenance on one or more components of vSystem 100. As a result, run-level request 200-1 may be for transitioning vSystem 100 from running run-level to maintenance run-level. The components of vSystem 100 may include servers, applications and workloads 106, computing resources, data storage devices, workstations, etc. Admin device 160 may be operated by an administrator user responsible for executing the maintenance of vSystem 100. Maintenance may include upgrading the one or more components of vSystem 100, recoveries, or backups.

Gateway 110 may receive run-level request 200-1. The run-level request 200-1 may include the administrator user's authentication details operating admin device 160. Gateway 110 may transmit a query 200-2 to database 140 to retrieve a type for the administrator user operating admin device 160 based on the user's authentication details. Gateway 110 may determine that the type of the administrator user is administrator.

Informer 112 may transmit request 200-3 to config file 102 to retrieve the current run-level of vSystem 100. Informer 112 may determine that the current-level of vSystem 100 is running run-level. Gateway 110 may transmit request 200-4 to middleware 114 to retrieve the set of restrictions for administrator users corresponding to the running run-level. Gateway 110 may determine that administrator users may access vSystem 100 while vSystem 100 is in running run-level based on the set of restrictions for administrator users corresponding to the running run-level. As a result, gateway 110 may transmit request 200-5 to Restful API 104.

Request 200-5 may include the details of run-level request 200-1. Restful API 104 may format request 200-5 so that it may be received by controller 103. Formatted request 200-5 may be request 200-6. Restful API 104 may transmit request 200-6 to controller 103. Request 200-6 may include the details of run-level request 200-1. That is, request 200-6 may include instructions to execute maintenance on the one or more components of vSystem 100 and to transition vSystem 100 from a running run-level to a maintenance run-level.

Controller 103 may receive request 200-6. Controller 103 may implement a state machine on vSystem 100 with three different run-levels. This way, vSystem 100 has one run-level at a time or a finite state. The three different run-levels may include running run-level, maintenance run-level, and stopped run-level.

During the running run-level, all applications and workloads 106 may be executed on vSystem 100. During the maintenance run-level, maintenance may be executed on one or more components of vSystem 100. The stopped run-level may indicate that all applications and workloads 106 have been halted. The stopped run-level follows the maintenance run-level to complete any necessary maintenance on vSystem 100.

In response to controller 103 receiving request 200-6, controller 103 may transmit request 200-7 to config file 102 to persist in config file 102 that the current run-level of vSystem 100 is the maintenance run-level. In some embodiments, the current run-level may also be the desired run-level. Moreover, once controller 103 persists that the current run-level of vSystem 100 is the maintenance run-level, a set of restrictions corresponding to the maintenance run-level may be implemented.

Controller 103 may execute a set of actions to transition to the maintenance level. The set of actions may be referred to as post-transition hooks. The set of actions may include terminating all non-administrative applications and workloads and active member user sessions. Controller 103 may transmit request 200-8 to applications and workloads 106. Request 200-8 may include instructions for terminating all non-administrative applications and workloads executing on vSystem 100. As indicated above, applications and workloads 106 may include administrative applications and workloads and non-administrative applications and workloads. The non-administrative applications and workloads may be operated and executed by member users that access vSystem 100. The administrative applications and workloads may be for executing maintenance on vSystem 100. Controller 103 may also terminate all active member user sessions.

Controller 103 may capture a state of vSystem 100. The state may include the current state of the data, applications, or workloads being executed on vSystem 100, the current state of the servers, computing resources, workstations, etc. Controller 103 may transmit request 200-9 to in-memory 108 to store the state of vSystem 100 in in-memory 108.

In response to successfully executing the set of actions, controller 103 may have gracefully transitioned vSystem 100 from running run-level to maintenance run-level. In the event that controller 103 was unable to transition vSystem 100 from running run-level to maintenance run-level gracefully, controller 103 may restore vSystem 100 to a state before the transition. In other words, controller 103 may reconfigure vSystem 100 to match the state before the transition. For example, if there is an operation error, system failure, an unexpected crash, etc., controller 103 may retrieve the captured state of vSystem 100 from in-memory 108 and restoring or reconfiguring vSystem 100 to the retrieved state. Once vSystem 100 is restored to the retrieved state, controller 103 may attempt to transition vSystem 100 from the running run-level to the maintenance run-level. Controller 103 may store vSystem 100 to a previous state stored in in-memory 108 at any time at which controller 103 determines that it has failed to transition from one run-level to the next gracefully.

In response to gracefully transitioning from the running run-level to the maintenance run-level, admin device 160 may transmit request 202-1 to vSystem 100. Request 202-1 may be to access one or more administrative applications or workloads from applications and workloads 106 to execute the maintenance of vSystem 100. As indicated above, the maintenance of vSystem 100 may involve upgrades, recoveries, backups, etc. One or more administrative applications or workloads from applications and workloads 106 may facilitate the maintenance.

Gateway 110 may receive request 202-1. Request 202-1 may include the authentication details of the administrator user operating admin device 160. Gateway 110 may transmit a query 202-2 to database 140 to retrieve a type for the administrator user operating admin device 160 based on the user's authentication details. Gateway 110 may determine the type of the administrator user is administrator.

Informer 112 may transmit request 202-3 to config file 102 to retrieve the current run-level of vSystem 100. Informer 112 may determine that the current run-level of vSystem 100 is maintenance run-level based on request 202-3. Gateway 110 may transmit request 202-4 to middleware 114 to retrieve the set of restrictions for administrator users corresponding to the maintenance run-level. Gateway 110 may determine that administrator users may access the one or more administrative applications and workloads of applications and workloads 106 while vSystem 100 is in the maintenance run-level based on the set of restrictions for administrator users corresponding to the maintenance run-level.

Gateway 110 may transmit request 202-5 to applications and workloads 106. Request 200-5 may allow admin device 160 to interface with the one or more administrative applications and workloads of applications and workloads 106. Admin device 160 may interface with the one or more administrative applications and workloads to execute the maintenance on the one or more components of vSystem 100.

Client device 150 may transmit request 204-1 to vSystem 100. Client device 150 may be operated by a member user. As indicated above, member users interface with vSystem 100 to execute non-administrative applications and workloads of applications and workloads 106. Request 204 may be for accessing one or more non-administrative applications or workloads of applications and workloads 106.

Gateway 110 may receive request 204-1. Request 204-1 may include the authentication details of the member user operating client device 150. Gateway 110 may transmit a query 204-2 to database 140 to retrieve a type of the member user operating client device 150 based on the user's authentication details. Gateway 110 may determine that the type of the member user is member.

Informer 112 may transmit request 204-3 to config file 102 to retrieve the current run-level of vSystem 100. Informer 112 may determine that the current run-level of vSystem 100 is maintenance run-level based on request 204-3. Gateway 110 may transmit request 204-4 to middleware 114 to retrieve the set of restrictions for member users corresponding to the maintenance run-level. Gateway 110 may determine that member users may not access the one or more non-administrative applications and workloads of applications and workloads 106 while vSystem 100 is in the maintenance run-level based on the set of restrictions for member users corresponding to the maintenance run-level. As a result, gateway 110 may restrict, block, or reject request 204-1 transmitted by client device 160.

In response to successfully executing the maintenance on the one or more components of vSystem 100, controller 103 may determine that vSystem 100 should transition to stopped run-level to complete the maintenance of the one or more components of vSystem 100. Therefore, controller 103 may transmit request 206-1 to config file 102 to persist that the current run-level of vSystem 100 is the stopped run-level. In response to controller 103 persisting that the current run-level of vSystem 100 is the stopped run-level, a set of restrictions for accessing vSystem 100 corresponding to the stopped run-level may be implemented.

To transition vSystem 100 from the maintenance run-level to the stopped run-level, controller 103 may execute a set of actions. The set of actions may include terminating all applications and workloads 106 executing on vSystem 100.

As the non-administrative applications and workloads 106 may have been already terminated during the transition to the maintenance run-level, controller 103 may transmit request 206-2 to applications and workloads 106 to terminate the one or more administrative applications and workloads executing on vSystem 100. Controller 103 may capture a state of vSystem 100 and transmit request 206-3 to in-memory 108 to store the current state of vSystem 100 in in-memory 108.

Once controller 103 executes the set of actions, vSystem 100 may gracefully transition to stopped run-level. As indicated above, in the event controller 103 fails to gracefully transition vSystem 100 from the maintenance run-level to the stopped run-level, controller 103 may restore vSystem 100 to a previous state stored in in-memory 108.

Admin device 160 may transmit request 208-1 to vSystem 100 to access vSystem 100. Gateway 110 may receive request 208-1. Request 208-1 may include the authentication details of the administrator user operating admin device 160. Gateway 110 may transmit a query 208-2 to database 140 to retrieve a type of the administrator user operating admin device 160 based on the user's authentication details. Gateway 110 may determine the type of the administrator user is administrator.

Informer 112 may transmit request 208-3 to config file 102 to retrieve the current run-level of vSystem 100. Informer 112 may determine that the current run-level of vSystem 100 is stopped run-level based on request 208-3. Gateway 110 may transmit request 208-4 to middleware 114 to retrieve the set of restrictions for administrator users corresponding to the stopped run-level. Gateway 110 may determine that administrator users may not access vSystem 100 while vSystem 100 is in the stopped run-level based on the set of restrictions for administrator users corresponding to the stopped run-level. As a result, gateway 110 may restrict, block, or reject request 208-1 transmitted by admin device 160.

Controller 103 may transition vSystem 100 from the stopped run-level to the maintenance run-level by persisting in config file 102 that the current run-level of vSystem 100 is the maintenance run level. Furthermore, controller 103 may transition vSystem 100 from the maintenance run-level to the running run-level persisting in config file 102 that the current run-level of vSystem 100 is the running run level, capturing a state of vSystem 100, and storing the state of vSystem 100 in in-memory 108.

During the running run-level, member users may access and execute the non-administrative applications and workloads of applications and workloads 106. Furthermore, during the running run-level, administrator users may access and execute the administrative applications and workloads of applications and workloads 106.

Figure 3:
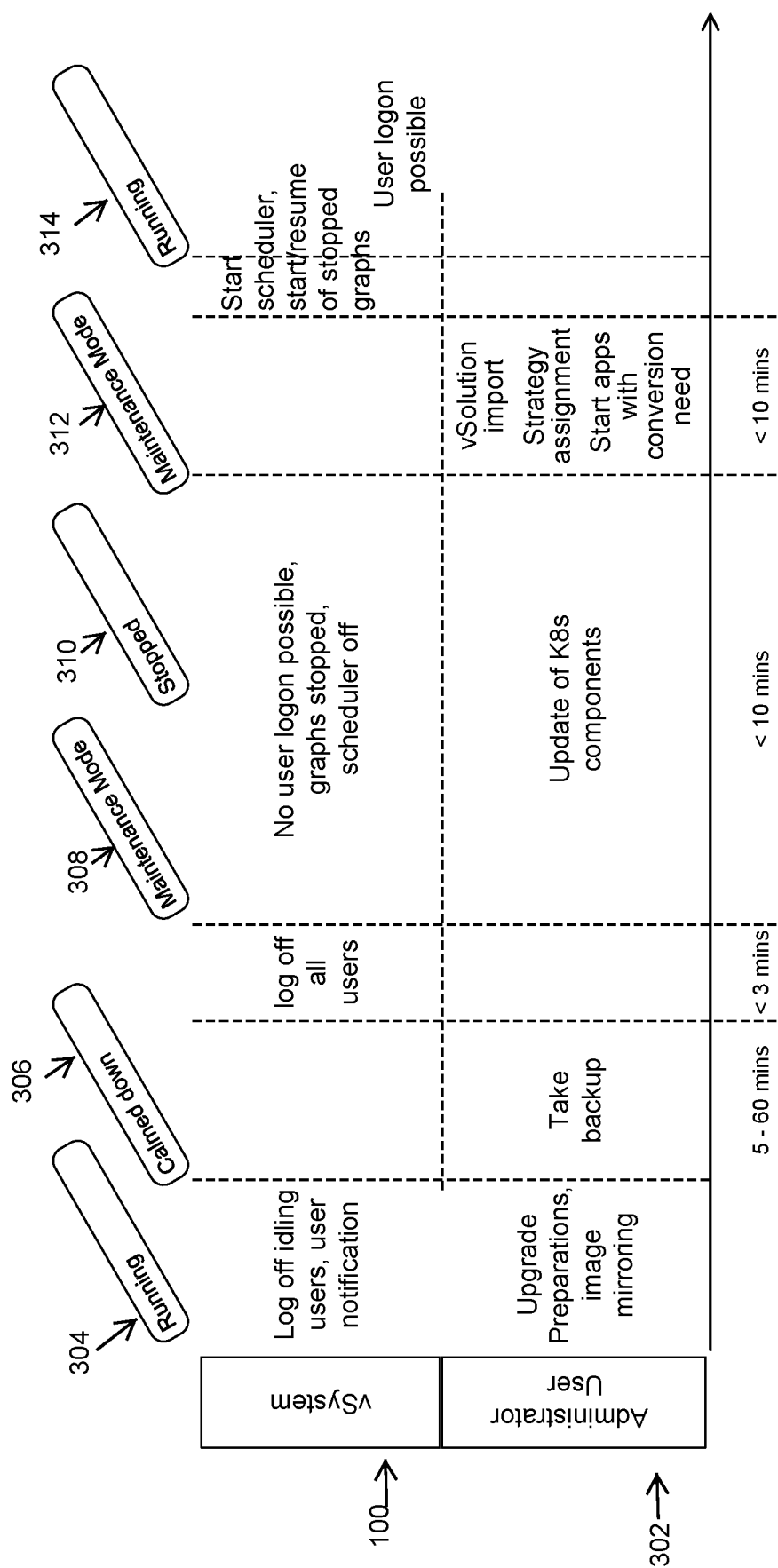
FIG. 3 is an activity diagram of the system for managing run-levels, according to some embodiments.

FIG. 3 is an activity diagram 300 of the system for managing run-levels, according to some embodiments. FIG. 3 will be described with respect to FIG. 1. Activity diagram 300 illustrates the events taking place during various run-levels in vSystem 100.

In the event an administrator user 302 initiates an upgrade of one or more components of vSystem 100, a run-level request may be transmitted to vSystem 100. As a result, vSystem 100 may initiate a transition from running run-level 304 to calmed down run-level 306.

To transition from running run-level 304 to calmed down run-level 306, controller 103 may terminate non-administrative applications and workloads from applications and workloads 106. Furthermore, controller 103 may terminate any idling user sessions. Idling user sessions may be user sessions that are active (i.e., not logged off) but not being used. The non-administrative applications and workloads may be applications or workloads not necessary for the upgrade. Controller 103 may identify the non-administrative applications or workloads based on the run-level request. Controller 103 may persist in config file 102 that vSystem is in calmed down run-level.

During the transition from running run-level 304 to calmed down run-level 306, administrator user 302 may prepare vSystem 100 for the upgrade by capturing an image of vSystem 100. Administrator user 302 may store the image in in-memory 108.

Once in calmed down run-level 306, vSystem 100 may transition to maintenance run-level 308. To transition to maintenance run-level 308, controller 103 may terminate all active user sessions. Furthermore, administrator user 302 may initiate a backup of vSystem 100. Administrator user 302 may store the backup in database 140 or in-memory 108. Controller 103 may persist that vSystem 100 is in maintenance run-level 308 in config file 102.

Once controller 103 persists that vSystem 100 is in maintenance run-level 308 in config file 102, member users may not be able to access vSystem 100. Moreover, non-administrative applications may not be executed during maintenance run-level 308. During the maintenance run-level 308, administrator user 302 may use administrative applications or workloads to upgrade the one or more components of vSystem 100.

During the upgrade, vSystem 100 may transition from maintenance run-level 308 to stopped run-level 310. Controller 103 may persist in config file 102 that vSystem is in stopped run-level 310. During stopped run-level 310, all administrative applications and workloads may be terminated, and administrator users and member users may not be able to access vSystem 100.

vSystem 100 may transition from stopped run-level 310 back to maintenance run-level 308. Controller 103 may persist in config file 102 that vSystem 100 is in maintenance run-level 308. Therefore, administrator users may access vSystem 100. During maintenance run-level 308, administrator user 302 may execute one or more applications of applications and workloads 106 for which conversion is necessary based on the upgrades of the one or more components of vSystem 100.

Once the upgrade of the one or more components of vSystem 100 is complete, vSystem 100 may transition to running run-level 304. Controller 103 may persist in config file 102 that vSystem 100 is in running run-level 304. Therefore, administrator users and member users may access vSystem 100 to execute or interact with administrative and non-administrative applications and workloads of applications and workloads 106. Controller 103 may restart a scheduler in running run-level 304.

Figure 4:
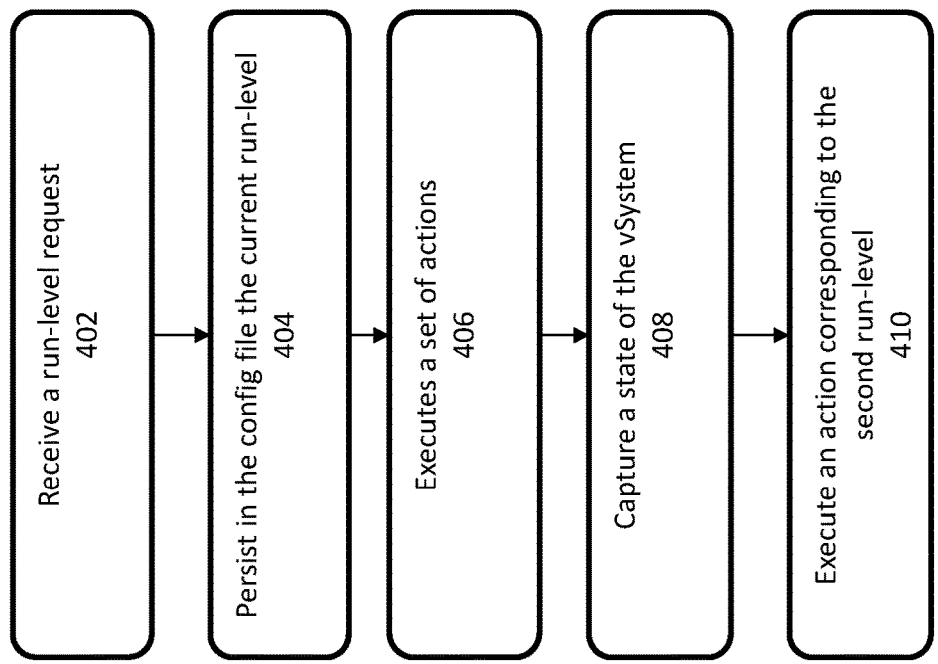
FIG. 4 is a flowchart illustrating a process for transitioning from one run-level to the next run-level, according to some embodiments.

FIG. 4 is a flowchart illustrating a process for transitioning a vSystem from a first run-level to a second run-level, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIG. 1. However, method 400 is not limited to that example embodiment.

In 402, controller 103 receives a run-level request to transition vSystem 100 from a first run-level to a second run-level. The run-levels may include running run-level, maintenance run-level, and stopped run-level. During the running run-level, member users and administrative users may access applications and workloads 106 executing on vSystem 100. Moreover, during the running run-level, member users and administrative users may execute or halt the execution of applications and workloads 106 in vSystem 100. The maintenance run-level may be for executing recoveries, upgrades, backups, etc. The stopped run-level may be when vSystem 100 is shutdown. As a non-limiting example, the run-level request may be received in response to initiating maintenance on vSystem 100. The run-level request may be transmitted to controller 103 from admin device 160. Alternatively, the run-level request may be automatically transmitted to controller 103 as part of scheduled maintenance to vSystem 100.

In 404, controller 103 persists in config file 102 that the current run-level is the second run-level. In response to controller 103 persisting that desired run-level is in the second run-level, the set of restrictions corresponding to the second run-level may be implemented. For example, the second run-level may be a maintenance run-level. The set of restrictions may indicate that member users may not access applications and workloads executing on vSystem 100 during the second run-level. Moreover, the set of restrictions may indicate that member users may not execute applications and workloads 106 in vSystem 100 during the maintenance run-level. The set of restrictions may also indicate that administrative users may access the administrative applications and workloads executing on vSystem 100. In some embodiments, controller 103 may terminate any active member user sessions as well. In the event the second run-level is a stopped run-level, the set of restrictions may indicate that neither the member users or administrator users may have access to vSystem 100.

In 406, controller 103 executes a set of actions corresponding to a transition from the first run-level to the second run-level. In the event controller 103 is transitioning vSystem 100 from a running run-level to a maintenance run-level, the set of actions may include terminating all non-administrative applications and workloads of applications and workloads 106 executing on vSystem 100. As a result, the administrative applications and workloads of applications and workloads 106 may remain executing during the second run-level. Moreover, administrative applications and workloads of applications and workloads 106 may be executed during the second run-level. As indicated above, the second run-level may be the maintenance run-level. In this regard, the administrative applications and workloads may be necessary for executing the maintenance (upgrades, recoveries, backups, etc.) on vSystem 100. The set of actions may also include terminating all the active member user sessions. In the event controller 103 is transitioning vSystem 100 from a maintenance run-level to a stopped run-level, the set of actions may include terminating the administrative applications and workloads of applications and workloads 106. In response to successfully executing the set of actions, vSystem 100 may gracefully transition from the first run-level to the second run-level.

In 408, controller 103 captures a state of vSystem 100. Controller 103 may capture the state of the administrative applications and workloads executing on vSystem 100, active user sessions, the current state of the data, etc. Controller 103 may store the current state of vSystem 100 in in-memory 108.

In 410, controller 103 executes an action corresponding to the second run-level. If the second run-level is the maintenance run-level, the second run-level may involve executing the upgrades to one or more components of vSystem 100. Alternatively, the second run-level may involve the recovery of one or more components of vSystem 100 or backups of one or more components of vSystem 100. The one or more components may include applications and workloads 106, servers, data storage devices, workstations, computing resources, etc. If the second run-level is the stopped run-level, vSystem 100 may be shutdown.

Figure 5:
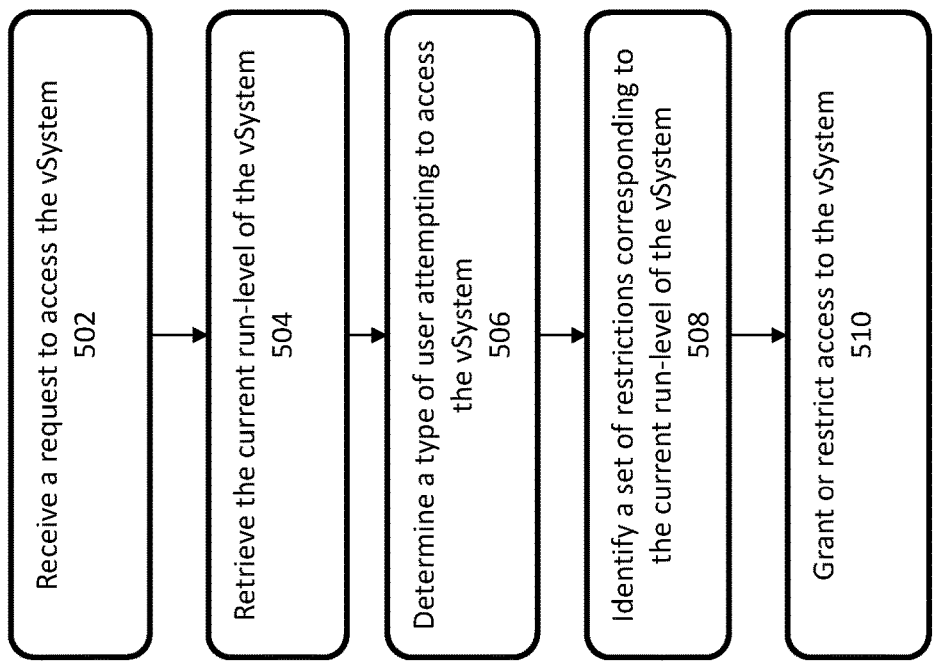
FIG. 5 is a flowchart illustrating a process for accessing a vSystem during a run-level, according to some embodiments.

FIG. 5 is a flowchart illustrating a process for authenticating a user attempting to access vSystem 100 during a current run-level of vSystem 100, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art.

Method 500 shall be described with reference to FIG. 1. However, method 500 is not limited to that example embodiment.

In 502, gateway 110 receives a request to access vSystem 100. The request may include a user's authentication details. Gateway 110 may be part of vSystem 100 and may be configured to manage the access to vSystem 100. For example, gateway 110 may receive the request from user device 150 or admin device 160. In the event gateway 110 receives the request from user device 150, the user may be a member user. In the event gateway 110 receives the request from admin device 160, the user may be an admin user.

In 504, informer 112 retrieves the current run-level of vSystem 100 from config file 102. Controller 103 may persist the next run-level of vSystem 100 before transitioning to the next run-level. The run-levels may include a first, second, and third run-level. The first run-level may be a running run-level, the second run-level may be a maintenance run-level, and a third run-level may be a stopped run level.

In 506, gateway 110 determines a type of user attempting to access vSystem 100 based on the user's authentication details. The type may include member user and administrator user. The authentication details may be a username and password. Gateway 110 retrieves user information using the user's authentication details from database 140. The user information may indicate the type of the user.

In 508, gateway 110 interfaces with middleware 114 to identify a set of restrictions corresponding to the current run-level (i.e., second run-level) of vSystem 100 and user type. Middleware 114 may be configured to store the set of restrictions for the different user types corresponding to each run-level of vSystem 100.

In 510, gateway 110 grant or restrict access to vSystem 100 based on the set of restrictions corresponding to the current run-level of vSystem 100 and the user type that transmitted the request. For example, during the running run-level (i.e., first run-level), the set of restrictions may indicate that both member and administrator users may access vSystem 100 to interface with one or more applications and workloads of applications and workloads 106 or to execute one or more applications or workloads of applications and workloads 106. During the maintenance run-level (i.e., second run-level), the set of restrictions may indicate that the member users may not access the vSystem 100 to interface with the applications and workloads 106 or to execute new applications or workloads, and administrator users may access or execute administrative applications and workloads of applications and workloads 106. The administrative applications and workloads may be used to execute maintenance of vSystem 100.

Figure 6:
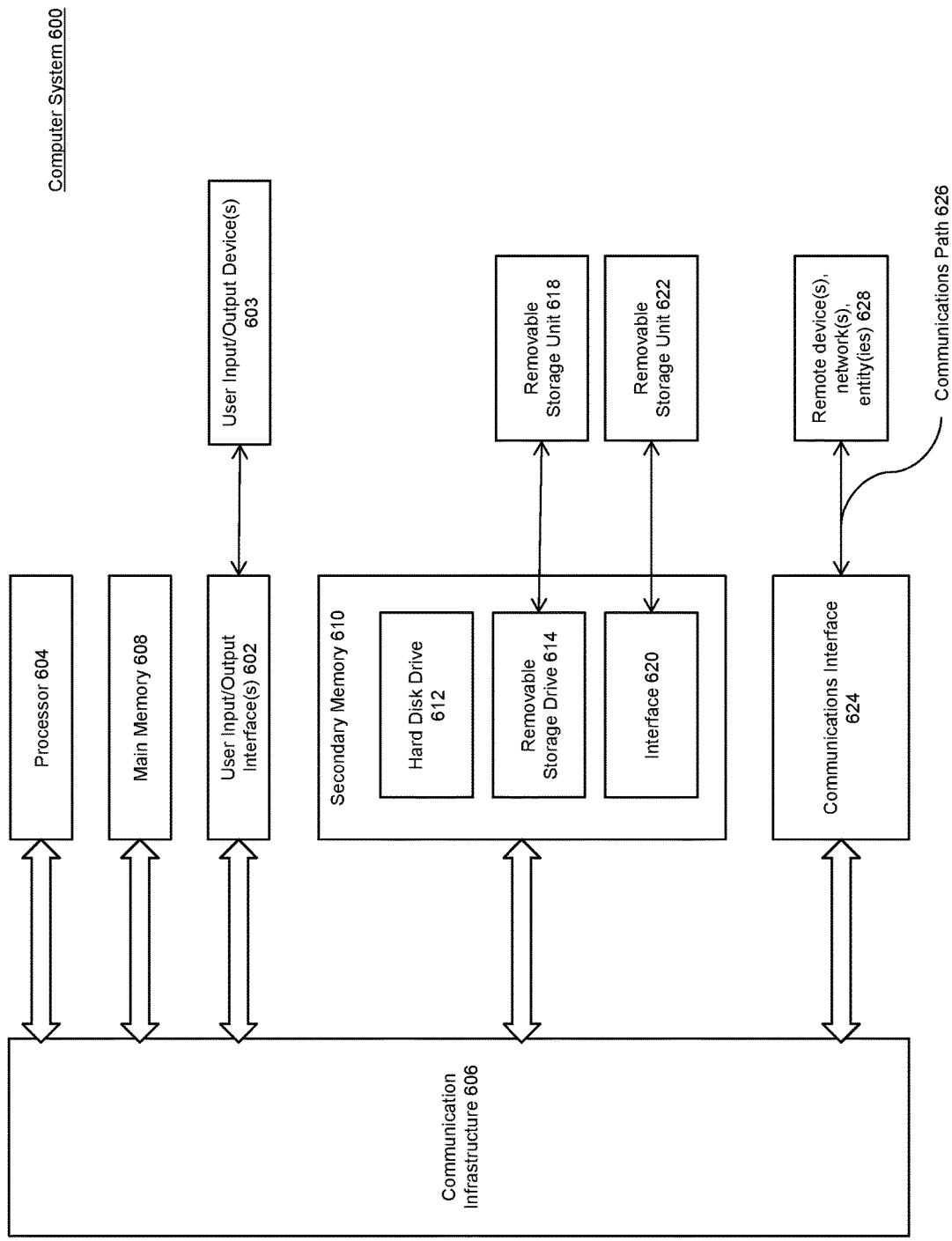
FIG. 6 is an example computer system useful for implementing various embodiments.

Various embodiments can be implemented, for example, using one or more computer systems, such as computer system 600 shown in FIG. 6. Computer system 600 can be used, for example, to implement methods 400 of FIG. 4, and 500 of FIG. 5. Furthermore, computer system 600 can be at least part of vSystem 100, database 140, client device 150, and admin device 160, as shown in FIG. 1. For example, computer system 600 route communication to various applications. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 can include one or more levels of cache. Main memory 608 has stored therein control logic (i.e., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data. Removable storage unit 618 can be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 can include other means, instrumentalities, or other approaches for allowing computer programs and/or other instructions and/or data to be accessed by computer system 600. Such means, instrumentalities, or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 enables computer system 600 to communicate and interact with any combination of remote devices, remote networks, remote entities, etc. (individually and collectively referenced by reference number 628). For example, communication interface 624 can allow computer system 600 to communicate with remote devices 628 over communications path 626, which can be wired and/or wireless, and which can include any combination of LANs, WANs, the Internet, etc. Control logic and/or data can be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for managing system run-levels, the method comprising:
   receiving, by one or more computing devices, a run-level request to transition a computing cluster from a first run-level to a second run-level, wherein the computing cluster includes one or more servers;
   persisting, by the one or more computing devices, a current run-level of the computing cluster as the second run-level in a configuration file;
   executing, by the one or more computing devices, a set of actions corresponding to the second run-level to transition the computing cluster from the first run-level to the second-level, wherein the set of actions corresponding to the second run-level comprises terminating, by the one or more computing devices, one or more administrative applications and workloads being executed on the computing cluster;
   receiving, by the one or more computing devices, a request to access the computing cluster, the request including authentication details of a user;
   determining, by the one or more computing devices, a type of user attempting to access the computing cluster based on the authentication details of the user;
   retrieving, by the one or more computing devices, a set of restrictions for accessing the computing cluster corresponding to the current run-level of the computing cluster as indicated in the configuration file and the type of user attempting to access the computing cluster; and
   granting or restricting, by the one or more computing devices, access to the computing cluster based on the set of restrictions.

2. The method of claim 1, further comprising:
   storing, by the one or more computing devices, a state of the computing cluster during the transition of the computing cluster from the first run-level and the second run-level in a storage device.

3. The method of claim 2, further comprising:
   receiving, by the one or more computing devices, an operational error during the second run-level;
   retrieving, by the one or more computing devices, the state of the computing cluster in the storage device during the transition of the computing cluster from the first run-level to the second run-level;
   reconfiguring, by the one or more computing devices, the computing cluster to match the retrieved state of the computing cluster; and re-executing, by the one or more computing devices, operations corresponding to the second run-level on the computing cluster.

4. The method of claim 1, wherein the set of actions corresponding to the second run-level comprises:
terminating, by the one or more computing devices, one or more non-administrative applications and workloads being executed on the computing cluster; and
terminating, by the one or more computing devices, one or more user sessions existing on the computing cluster.

5. The method of claim 1, wherein the type of user is one of an administrator user or a member user.

6. The method of claim 5, wherein the first run-level is a running run-level and the second run-level is a maintenance run-level, and wherein the set of restrictions for accessing the computing cluster during the running run-level indicate that member users or administrator users may access one or more applications or workloads on the computing cluster, and the set of restrictions for accessing the computing cluster during the maintenance run-level indicate that the member users are restricted from accessing the one or more applications or workloads on the computing cluster.

7. The method of claim 5, wherein the first run-level is a maintenance run-level and the second run-level is a stopped run-level, and wherein the set of restrictions for accessing the computing cluster during the stopped run-level indicate that member users and administrator users are restricted from accessing one or more applications or workloads on the computing cluster.

8. A system for managing system run-levels, the system comprising:
a memory; and
a processor coupled to the memory, the processor configured to:
receive a run-level request to transition a computing cluster from a first run-level to a second run-level, wherein the computing cluster includes one or more servers;
persist a current run-level of the computing cluster as the second run-level in a configuration file;
execute a set of actions corresponding to the second run-level to transition the computing cluster from the first run-level to the second-level, wherein the set of actions corresponding to the second run-level comprise:
terminating one or more non-administrative applications and workloads being executed on the computing cluster; and
terminating one or more user sessions existing on the computing cluster;
receive a request to access the computing cluster, the request including authentication details of a user;
determine a type of user attempting to access the computing cluster based on the authentication details of the user;
retrieve a set of restrictions for accessing the computing cluster corresponding to the current run-level of the computing cluster as indicated in the configuration file and the type of user attempting to access the computing cluster; and
grant or restrict access to the computing cluster based on the set of restrictions.

9. The system of claim 8, wherein the processor is further configured to:
store a state of the computing cluster during the transition of the computing cluster from the first run-level and the second run-level in a storage device.

10. The system of claim 9, the processor further configured to:
receive an operational error during the second run-level;
retrieve the state of the computing cluster in the storage device during the transition of the computing cluster from the first run-level to the second run-level;
reconfigure the computing cluster to match the retrieved state of the computing cluster; and
re-execute operations corresponding to the second run-level on the computing cluster.

11. The system of claim 8, wherein the set of actions corresponding to the second run-level comprises terminating one or more administrative applications and workloads being executed on the computing cluster.

12. The system of claim 8, wherein the type of user is one of an administrator user or a member user.

13. The system of claim 12, wherein the first run-level is a running run-level and the second run-level is a maintenance run-level, and wherein the set of restrictions for accessing the computing cluster during the running run-level indicate that member users or administrator users may access one or more applications or workloads on the computing cluster, and the set of restrictions for accessing the computing cluster during the maintenance run-level indicate that the member users are restricted from accessing the one or more applications or workloads on the computing cluster.

14. The system of claim 12, wherein the first run-level is a maintenance run-level and the second run-level is a stopped run-level, and wherein the set of restrictions for accessing the computing cluster during the stopped run-level indicate that member users and administrator users are restricted from accessing one or more applications or workloads on the computing cluster.

15. A non-transitory computer-readable medium having instructions stored thereon that, when executed by at least one computing device, cause the at least one computing device to perform operations comprising, the operations comprising:
receiving a run-level request to transition a computing cluster from a first run-level to a second run-level, wherein the computing cluster includes one or more servers;
persisting a current run-level of the computing cluster as the second run-level in a configuration file;
executing a set of actions corresponding to the second run-level to transition the computing cluster from the first run-level to the second-level;
receiving a request to access the computing cluster, the request including authentication details of a user;
determining a type of user attempting to access the computing cluster based on the authentication details of the user;
retrieving a set of restrictions for accessing the computing cluster corresponding to the current run-level of the computing cluster as indicated in the configuration file and the type of user attempting to access the computing cluster; and
granting or restricting access to the computing cluster based on the set of restrictions,
wherein the type of user is one of an administrator user or a member user, and wherein the set of restrictions for accessing the computing cluster during the first run-level indicate that member users or administrator users may access one or more applications or workloads on the computing cluster, and the set of restrictions for accessing the computing cluster during the second run-level indicate that the member users are restricted from accessing the one or more applications or workloads on the computing cluster.

16. The non-transitory computer-readable medium of claim 15, wherein the set of actions corresponding to the second run-level comprising:
   terminating one or more non-administrative applications and workloads being executed on the computing cluster; and
   terminating one or more user sessions existing on the computing cluster.

17. The non-transitory computer-readable medium of claim 15, wherein the set of actions corresponding to the second run-level comprises terminating one or more administrative applications and workloads being executed on the computing cluster.

* * * * *